United States Patent
Welle et al.

(10) Patent No.: US 11,906,344 B2
(45) Date of Patent: Feb. 20, 2024

(54) METHOD FOR MEASURING FILL LEVELS

(71) Applicant: VEGA GRIESHABER KG, Wolfach (DE)

(72) Inventors: Roland Welle, Hausach (DE); Steffen Waelde, Niedereschach (DE)

(73) Assignee: VEGA GRIESHABER KG, Wolfach (DE)

( * ) Notice: Subject to any disclaimer, the term of this patent is extended or adjusted under 35 U.S.C. 154(b) by 959 days.

(21) Appl. No.: 16/423,318

(22) Filed: May 28, 2019

(65) Prior Publication Data

US 2019/0368912 A1     Dec. 5, 2019

(30) Foreign Application Priority Data

May 30, 2018   (EP) ..................... 18175198

(51) Int. Cl.
    *G01F 23/284*     (2006.01)
    *G01S 13/88*      (2006.01)

(52) U.S. Cl.
    CPC ............ *G01F 23/284* (2013.01); *G01S 13/88* (2013.01)

(58) Field of Classification Search
    CPC .................................................... G01F 23/284
    See application file for complete search history.

(56) References Cited

U.S. PATENT DOCUMENTS

| | | | | |
|---|---|---|---|---|
| 5,504,490 A | * | 4/1996 | Brendle | ............... G01F 23/284 340/612 |
| 7,639,177 B2 | * | 12/2009 | Welle | ................... G01F 23/284 342/124 |
| 9,513,153 B2 | * | 12/2016 | Jirskog | ................... G01S 13/26 |
| 9,645,003 B2 | * | 5/2017 | Malinovskiy | ............ G01S 7/023 |
| 10,209,346 B2 | * | 2/2019 | Malinovskiy | ......... G01F 23/284 |
| 10,539,449 B2 | * | 1/2020 | Faber | ......................... H01P 3/06 |
| 10,641,638 B2 | * | 5/2020 | Corbe | .................... G01S 13/58 |
| 2006/0137446 A1 | * | 6/2006 | Wennerberg | .......... G01F 23/284 73/290 V |

(Continued)

FOREIGN PATENT DOCUMENTS

| | | |
|---|---|---|
| DE | 102013108490 A1 | 2/2015 |
| DE | 102016100217 A1 | 6/2017 |
| EP | 1933117 A2 | 6/2008 |

OTHER PUBLICATIONS

Search report from the EPO for parallel European application 18 17 5198, dated Dec. 11, 2018.

*Primary Examiner* — Peter M Bythrow
(74) *Attorney, Agent, or Firm* — William Gray Mitchell

(57) ABSTRACT

Method for fill level measurement with a radar fill level measuring device using the following steps: sending a transmission design with a plurality of frequency ramps, receiving a reception signal per frequency ramp of the transmission signal, saving the reception signals in a memory, performing a first spectral analysis of the reception signals or performing a second spectral analysis of the reception signals, carrying out a second spectral analysis of several output signals of the first spectral analysis at the location of at least one significant reflector in the reception signal or performing a first spectral analysis of several output signals of the second spectral analysis, determining the distances of significant reflectors from the results of the first spectral analysis, determining the fill level echo based on the previously determined information.

12 Claims, 9 Drawing Sheets

(56) References Cited

U.S. PATENT DOCUMENTS

| | | | |
|---|---|---|---|
| 2007/0046528 A1* | 3/2007 | Larsson | G01F 23/284 342/124 |
| 2008/0105048 A1* | 5/2008 | Nilsson | G01F 23/284 73/290 V |
| 2008/0143583 A1* | 6/2008 | Welle | G01S 7/4008 342/124 |
| 2009/0235736 A1* | 9/2009 | Spanke | G01F 23/284 73/290 V |
| 2009/0278730 A1* | 11/2009 | Taylor | G01S 13/08 342/124 |
| 2009/0299662 A1* | 12/2009 | Fehrenbach | G01F 23/28 702/55 |
| 2010/0070207 A1* | 3/2010 | Sai | G01F 23/284 702/55 |
| 2010/0223019 A1* | 9/2010 | Griessbaum | G01F 23/2962 702/75 |
| 2011/0181458 A1* | 7/2011 | Feil | G01F 23/284 342/124 |
| 2012/0265486 A1* | 10/2012 | Klofer | G01F 23/2962 702/166 |
| 2012/0299768 A1* | 11/2012 | Griessbaum | G01F 23/2962 342/124 |
| 2013/0035880 A1* | 2/2013 | Hoferer | G01S 13/70 702/55 |
| 2013/0110420 A1* | 5/2013 | Griessbaum | G01F 23/0061 702/55 |
| 2014/0085132 A1* | 3/2014 | Jirskog | G01S 13/88 342/124 |
| 2015/0007653 A1* | 1/2015 | Fehrenbach | G01S 13/87 73/198 |
| 2015/0007655 A1* | 1/2015 | Skowaisa | G01F 23/284 73/198 |
| 2015/0233750 A1* | 8/2015 | Malinovskiy | G01S 7/354 342/124 |
| 2015/0377680 A1* | 12/2015 | Edvardsson | G01F 23/284 73/290 V |
| 2016/0054166 A1* | 2/2016 | Welle | G01F 23/282 702/155 |
| 2016/0202347 A1* | 7/2016 | Malinovskiy | G01S 7/352 342/124 |
| 2017/0082744 A1* | 3/2017 | Matsumoto | G01S 13/584 |
| 2017/0176236 A1* | 6/2017 | Corbe | G01F 23/284 |
| 2019/0004146 A1* | 1/2019 | von Rhein | G01S 13/32 |

* cited by examiner

FIG 7
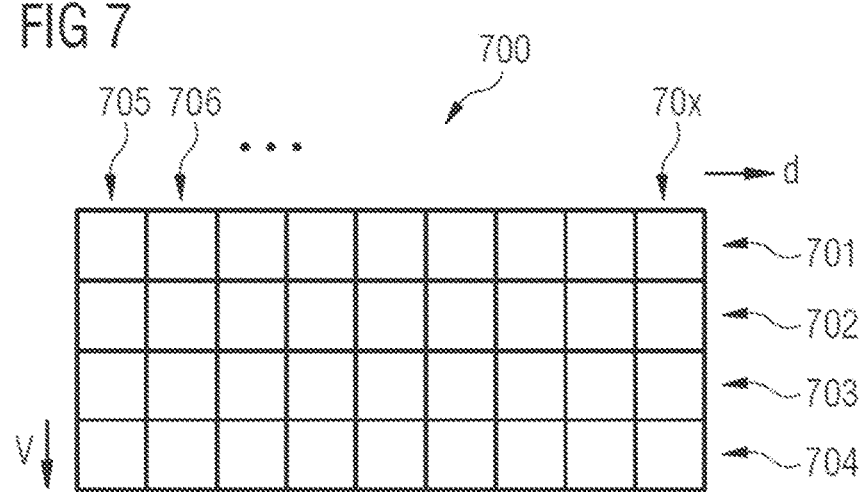
FIG 8
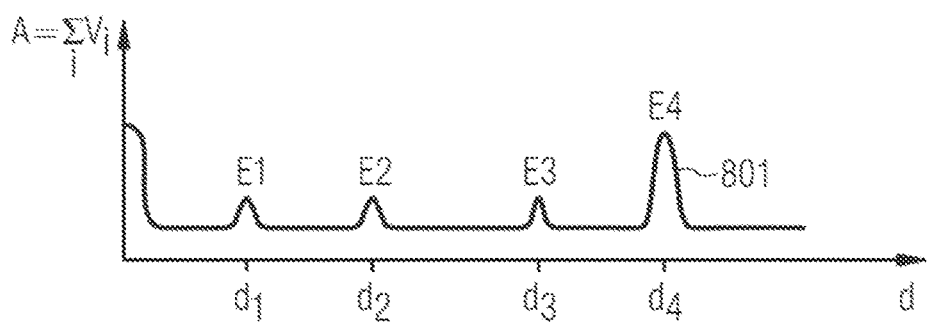
FIG 9A 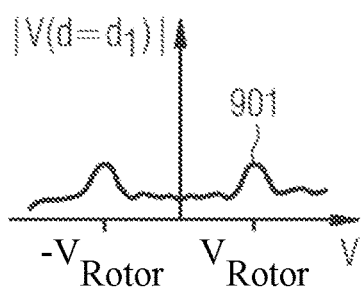 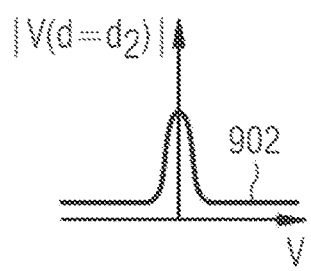 FIG 9B
FIG 9C 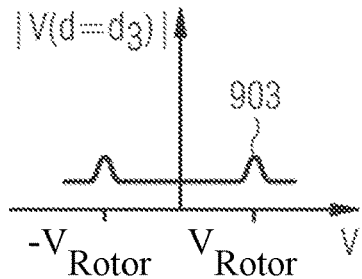 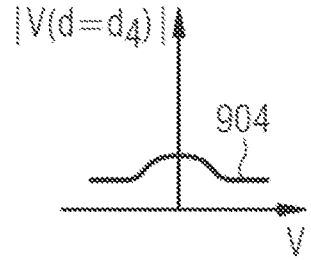 FIG 9D

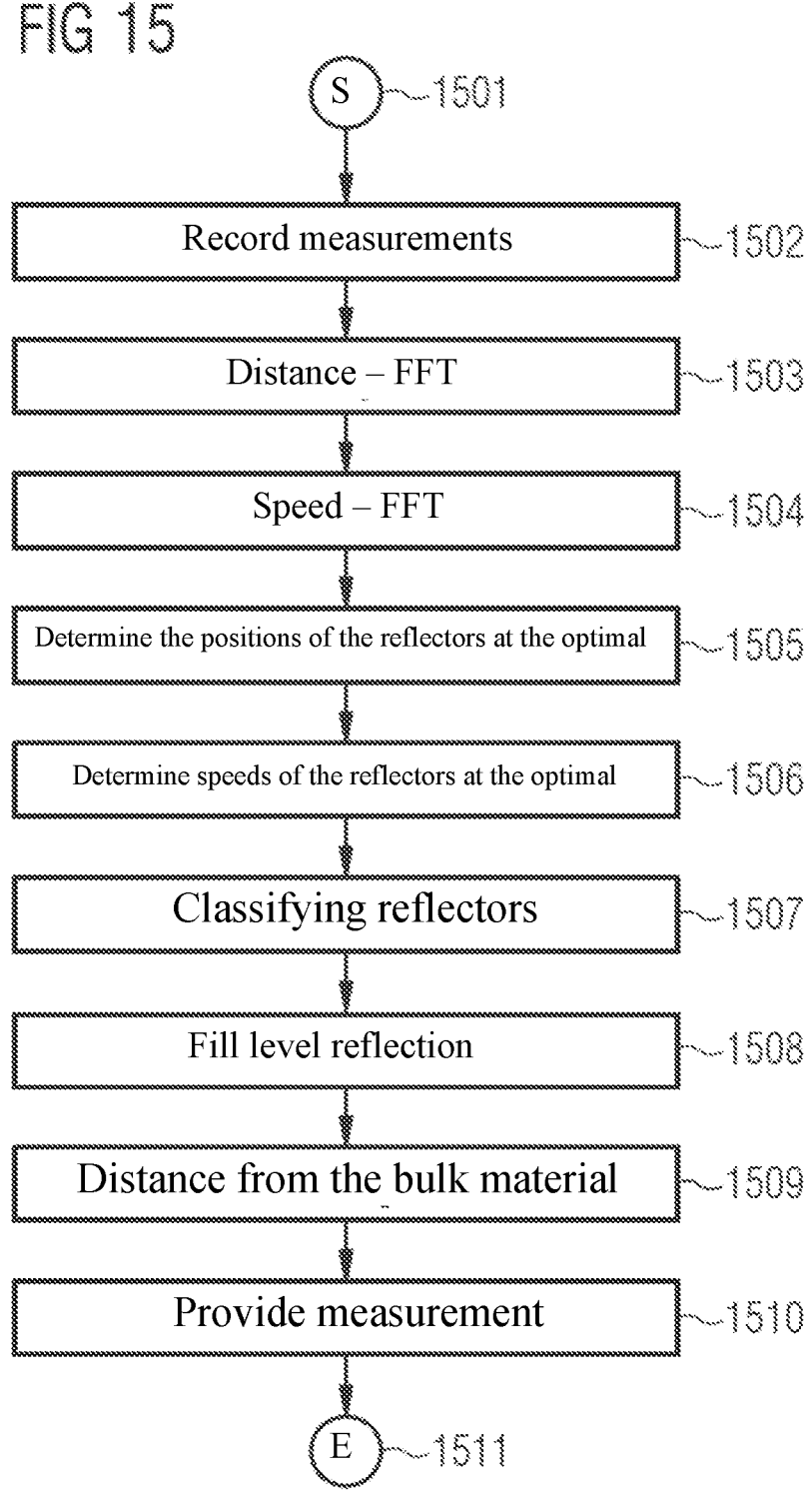

METHOD FOR MEASURING FILL LEVELS

CROSS REFERENCE TO RELATED APPLICATIONS

This patent application claims priority to European Patent Application 18 175 198.3, filed on May 30, 2018.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a method for measuring fill levels.

Background of the Invention

The measuring of fill levels using radar is today a standard prior art process. Due to largely being independent from external influences and through the development of higher working frequencies with the help of novel semiconductor components, very precise measurement results can be reliably obtained with modern radar level measuring devices. Fill level measuring devices of prior art measure the distance to a fill material and other reflection points, hereinafter also called reflectors, within a container by using a pulse run time method or a FMCW procedure (FMCW=Frequency Modulated Continuous Wave). However, it is not easily possible to determine the speed of the so-called reflectors in this way.

A challenge especially in the environment of chemical reaction tanks is still given in practice by an unfavorable assembly position of the measuring device.

FIG. 1 shows a fill level measuring arrangement 100 as known from the prior art. Due to the positions of assembly openings pre-defined by a measuring vessel 105 used, a radar fill level measuring device 101 which is also known as a radar measuring device, is located in a direct spatial proximity to an agitator 102, also assembled in the measuring vessel 105, with its agitator blades 103 reflecting at a first distance d1 and a third distance d3 measurement signals 104 emitted by the radar measuring device 101, hereinafter also referred to as transmission signals.

Within the measuring vessel 105, a supply pipe 106 is also located at a second distance d2 from the radar measuring device 101 for feeding a medium 107 or a reaction component required by the process. The measurement signals 104 are reflected in the measuring vessel 105 both by the surface of the medium 107 and also by other reflectors, e.g., the measuring blades (sic) 103 and the supply pipe 106, received by an antenna 109 of the radar measuring device 101, and used for determining the fill level, i.e. in the present case, a fourth distance d4 of the surface of the medium 107 from the radar measuring device 101. For determining the fill level d4, a differentiation of the fill level d4 must be made from the reflections of the other reflectors.

FIG. 2 shows common signal forms in the fill level measuring arrangement and a fill level measurement according to the FMCW procedure.

FIG. 2A shows in curve 209 the progression of a frequency f of a radar measurement signal 104 transmitted from the radar measuring device 101 during a measurement period T over time t.

During the measurement period T, the measurement signal 104 emitted by the radar measuring device 101 is usually modulated between a start frequency f1 and a target frequency f2 with increasing or decreasing frequency f. During this measurement period T, the high frequency signals reflected at individual reflection points 103, 106, 107 inside the vessel 105, which are detected by the antenna 109, are received as reception signals and converted to a digital representation in accordance with known methods, whose progression is shown in curve 202 of FIG. 2B and hereinafter called an intermediate signal.

In order to determine individual reflections, the intermediate signal is usually subjected to a spectral analysis, for example by using a fast Fourier transformation. The result of the spectral analysis is shown in curve 203 of FIG. 2C. This illustration is also called echo curve 203 and is present digitally in a memory of radar measuring device 101. The echo curve 203 represents the recorded radar signal output in dB as a function of the runtime or as a function of distance d from the radar measuring device.

In the present example, the echo curve 203 follows the scenario shown in FIG. 1. A first Echo E1 and a third Echo E3 are caused by the agitator blades 103 located in the visual area of the radar measuring device 101.

The second Echo E2 is created by reflecting the measurement signal 104 on the supply pipe 106. The last and in its amplitude strongest Echo E4 is generated by the surface of the medium 107. Standard methods identify the largest echo, in the present case the fourth Echo E4, as the echo from the fill material, and determine its distance d4 as the measurement of the actual fill level measurement.

However, the aforementioned method already leads in the example of FIG. 1 to an unreliable behavior if the agitator blade 103 of the agitator 102 carries out a rotation 110, thus the agitator being in operation. Depending on the alignment of the agitator blade 103, the signal output reflected thereby varies considerably, which leads to the echoes E1 and E3 being subject to massive amplitude fluctuations from one measurement to the next.

If the value of the amplitude of one of the echoes E1 or E3 exceeds the value of the amplitude of the Echo E4, an incorrect measured value is determined, which can lead to considerable problems in a control system of the fill level measuring arrangement 100.

The fill level measurement is drastically aggravated if in the measuring vessel 105 the inflow is activated in accordance with FIG. 1, i.e. the fill material 107 enters through the inflow tube 106 into the measuring container 105.

FIG. 3 shows a corresponding scenario in which fill material 301 flowing through the supply pipe 106 enters the measuring vessel 105. The fill material 301 flowing into the measuring vessel 105 via the supply pipe 106 is directly in the main direction of emission H of the radar measuring device 101 and thus in the main detection area of the radar measuring device 101. The inflowing medium 301 thus covers the view of the surface of the actual medium to be measured 107 and thus makes it difficult to measure the fill level.

FIG. 4 shows common signal forms in the fill level measurement according to the FMCW principle. FIGS. 4A and 4B show the transmission signal (FIG. 4A) and the transmitted and digitized reception signal (FIG. 4B, curve 401).

FIG. 4C shows the echo curve 402 determined by the fill measuring device 101 in this case. The reflections E1 of the first agitator blade 103 and E2 of the supply pipe 106 are recognized almost identical to the curve progression of FIG. 2. For echoes with a distance d, which is greater than the second distance d2 of the supply pipe 106, the level of the echo curve 402 increases massively, which is caused by the overlaying of a plurality of individual reflections on the particles of the inflowing medium 301. The identification of the fourth Echo E4 of the surface of the medium 107 as fill level d4 is almost impossible when the reflecting parts 403 of the inflowing fill material 301 generate an echo similar in intensity as the surface of the medium 107.

A secure identification and thus an exact measurement of the fill level in the measuring vessel 105 is almost impossible here. When filling the measuring vessel 105, this behavior especially represents a significant problem.

It is an objective of the present invention to provide a method for the fill level measurement, which allows a fill level measurement even in the situations described above.

This objective is attained in a method showing the features of patent claim 1. Advantageous further developments are the objective of the dependent claims.

BRIEF SUMMARY OF THE INVENTION

In a preferred embodiment, a method for fill level measurement with a radar fill level measuring device (101) using the following steps:
  sending a transmission signal (104) with a plurality of frequency ramps (501-504),
  receiving a reception signal per frequency ramp of the transmission signals (104),
  saving the reception signals in a memory,
  performing a first spectral analysis of the reception signals,
  determining at intervals (d) significant reflectors from the first spectral analysis of at least one reception signal,
  performing a second spectral analysis of several output signals of the first spectral analysis at least at the position of one significant reflector in the reception signal, and
  determination of the fill level echo due to the previously determined information.

In another preferred embodiment, the method as described herein, characterized in that the determination of the distances (d) takes place on the basis of a mean value over a plurality of receiving signals.

In another preferred embodiment, the method as described herein, characterized in that a classification of the individual reflectors takes place to determine the fill level echo from the distances of the significant reflectors based on specific characteristics.

In another preferred embodiment, the method as described herein, characterized in that historical information from previous measurements is taken into consideration for determining the fill level echo from the distances of the significant reflectors.

In another preferred embodiment, the method as described herein, characterized in that the spectral analysis is a fast Fourier transformation (FFT).

In another preferred embodiment, the method as described herein, characterized in that a transmission signal (104) with at least 25, preferably at least more, more preferably a few hundred frequency ramps is transmitted.

In another preferred embodiment, the method as described herein, characterized in that the transmission A1 (104) comprises a plurality of 2n frequency ramps (501-504).

In another preferred embodiment, the method as described herein, characterized in that the transmission signal (104) comprises 128, 256, or 512 frequency ramps (501-504).

In another preferred embodiment, the method as described herein, characterized in that a frequency ramp (501-504) shows a duration (t1-t4) between 1 μs and 1000 μs, preferably between 50 μs and 300 μs, particularly 100 μs or 200 μs.

In another preferred embodiment, the method as described herein, characterized in that a start frequency (f1) and/or a slope and/or a step width and/or a break time of the frequency ramp vary.

In another preferred embodiment, a method for the fill level measurement with a radar fill level measuring device, characterized in that the method is applied according to any of the preceding claims when a fill level measurement with a FMCW procedure is not possible.

In another preferred embodiment, a method for fill level measurement with a radar fill level measuring device (101) using the following steps:
  sending a transmission signal (104) with a plurality of frequency ramps (501-504),
  receiving a plurality of reception signals, 'wherein one reception signal is received per frequency ramp of the transmission signal (104),
  saving the reception signals in a memory,
  performing a second spectral analysis of the reception signals, wherein at least two of the reception signals of the plurality of reception signals (501-504) are used,
  performing a first spectral analysis of several output signals of the second spectral analysis,
  determining intervals (d) of significant reflectors from the results of the first spectral analysis,
  determining speed values of significant reflectors from the results of the second spectral analysis,
  determining the fill level echo based on information previously determined.

BRIEF DESCRIPTION OF THE DRAWINGS

FIG. 7 is a matrix for systematic analysis of the reception signals according to FIG. 6.

FIG. 8 is an echo signal, as can be determined from the reception signals according to FIG. 7.

FIG. 9A-9D is the speed distribution at the locations of the reflectors according to FIG. 8.

FIG. 15 is an exemplary process of the procedure of the present application.

DETAILED DESCRIPTION OF THE INVENTION

Figure 1:
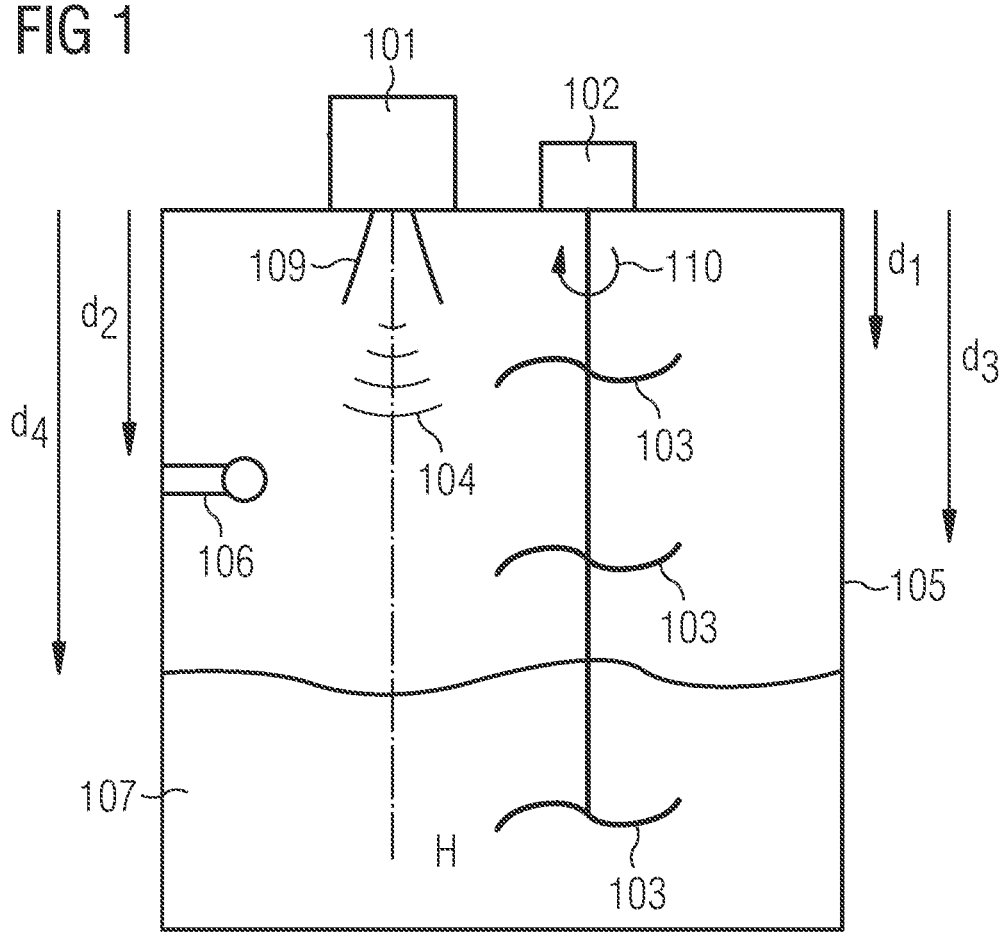
FIG. 1 is a line drawing evidencing a fill level measuring arrangement according to the prior art (already discussed).
Figure 2A:
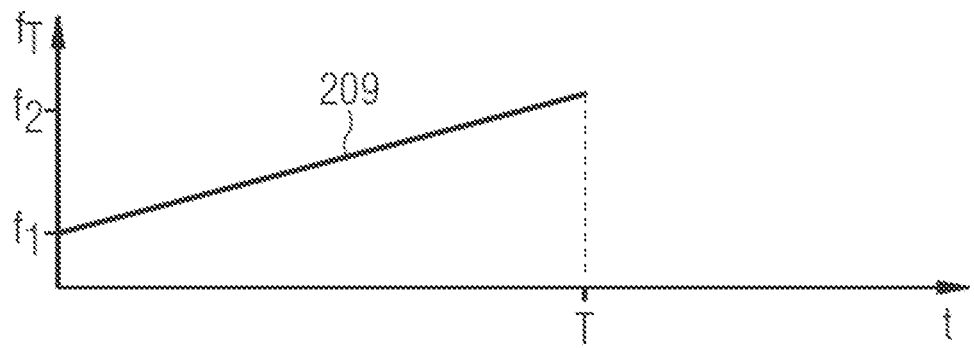
FIG. 2A-2C are signal curves in the fill level measurement arrangements according to FIG. 1.
Figure 2B:
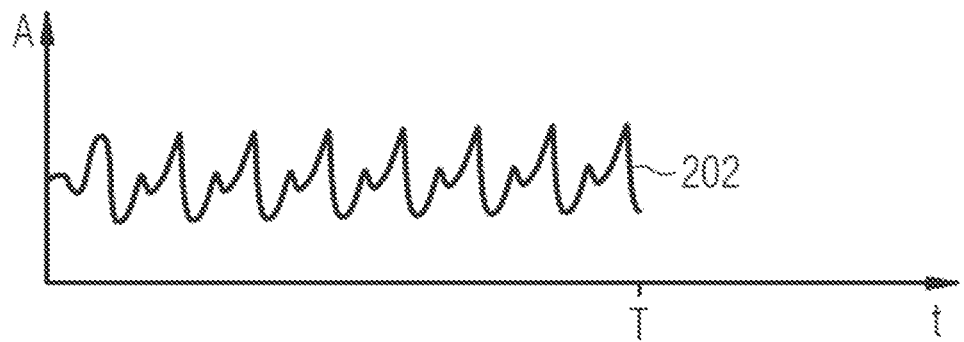
Figure 2C:
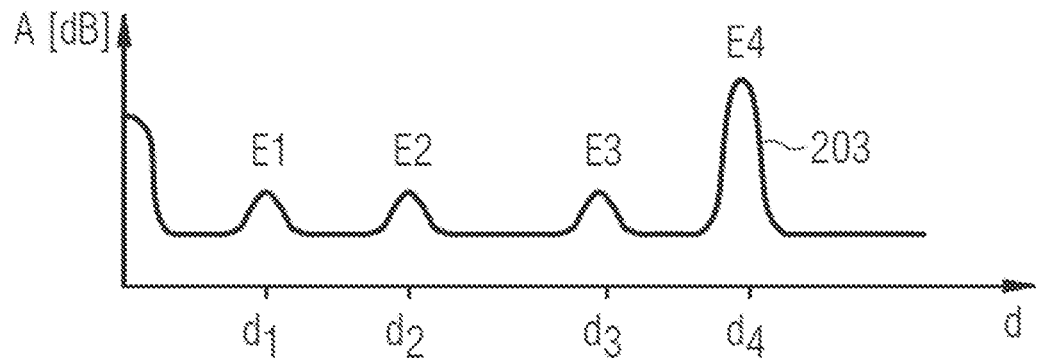

A method for measuring fill levels according to the invention with a radar fill level measuring device has the following steps:
  sending a transmission signal with a plurality of frequency ramps,
  receiving a reception signal per frequency ramp of the transmission signal,
  saving the reception signals,
  performing a first spectral analysis of the reception signals,
  determining at least one reception signal from the distances of significant reflectors from the first spectral analysis,
  performing a second spectral analysis of several output signals of the first spectral analysis at least at the point of at least one significant reflector,
  determining a change in a phase between the reception signals at the points of significant reflectors, and
  determining the fill level echo based on previously determined information.

For each measurement, the transmission signal has a plurality of frequency ramps. For such frequency ramps, which are also referred to as chirps, the transmission signal runs at a ramp duration from a few microseconds to a few hundred microseconds, for example, 100 µs or 200 µs, at a frequency range of some GHz, e.g. 5 GHz or 10 GHz, preferably at a frequency range between 75 GHz and 85 GHz. The frequency ramps can be continuously cycled through, so that a continuous change in the frequency or in a fine hatching may occur, e.g. in 5 Hz steps, comprising discrete frequency values within the frequency range.

Reception signals are received and stored in an intermediate memory, whereby one reception signal is obtained per frequency ramp. In particular, the reception signals can be written respectively in a row of the intermediate memory.

The individual reception signals are transferred in particular line-by-line from the time range to the frequency range with a first spectral analysis, whereby a frequency shift of the reception signal relative to the transmission signal is proportional to a distance of a reflector from the transmitter, so that relevant reflectors and their distances to the fill level measuring device can be determined from the signal received.

From the first spectral analysis, a signal is obtained from which the respective signal energy is visible at a specific frequency and thus at a specific distance from the radar measuring device. If the signal amplitude exceeds a specific value, then a relevant reflector is assumed.

Relevant reflectors are here, for example, reflectors with signals that, which based on a maximum detected signal amplitude of the signal, after the first spectral analysis, exceed a minimum amplitude which exceeds maximally 20 dB below the maximum amplitude. Alternatively, a classification of a reflector as a relevant reflector can also take place based on background noise. Relevant reflectors are then considered signals that exceed the background noise by at least 3 dB.

The definition of what is considered a relevant reflector can also be adjusted depending on the specific measuring conditions.

A phase shift of the signal is determined dependent on the speed of the reflector by the second spectral analysis, which is carried out column-wise, at least at the location, i.e. the frequencies of the relevant reflectors, via the output signals of the first spectral analysis. From the change in the phase over the individual reception signals, a speed distribution can be determined at the location of the reflectors.

Alternatively, it can also be provided to perform the second spectral analysis on the reception signals first, and to perform the first spectral analysis in a subsequent step based thereon via the output signals of the second spectral analysis. From the first spectral analysis, in this second exemplary embodiment, a signal is in turn received from which the respective signal energy is discernible at a specific frequency and thus at a specific distance from the radar measuring device. In contrast to the procedure described above, however, the identification of relevant reflectors is started only after completion of the second spectral analysis and the following first spectral analysis.

If these reflectors are identified, then the speed of the reflector can also be determined here based on the results obtained.

The details shown below describe the exact procedure for implementing the invention according to the above stated first procedure. However, it is pointed out that it is possible to adapt and modify the process steps and connections disclosed, in particular, to switch the sequence of the first spectral analysis and the second spectral analysis. The disclosure content of the present invention therefore explicitly includes both implementations.

The information obtained this way can be used by the fill level measuring device to reliably determine the fill level, i.e. the distance of the surface of the lever meter or a corresponding value. In particular, it is possible to assign a speed component to the individual reflectors and to exclude specific reflectors for determining the fill level.

The steps of the procedure described above are preferably carried out in the specified sequence. Alternatively, the second spectral analysis can occur in the column direction before the first spectral analysis occurs in the line direction. The two spectral analyses can also be summarized in a two-dimensional spectral analysis.

Determining the distances of the reflectors can be done to eliminate measurement errors in individual reception signals based on a mean value of a plurality of reception signals.

To determine the fill level echo from the distances of the significant reflectors, a classification of the individual reflectors can take place using specific characteristics. For example, a classification of the significant reflectors can be provided in at least one of the classes of fill level echo, interference echo, ground echo, inflow echo or agitator echo. It can be provided to perform the classification of at least one significant reflector based on a speed distribution at the location of the reflector. It can be provided to identify the fill level echo among a plurality of significant reflectors based on a preclusion procedure.

Different classes of reflectors can be differentiated through such classification. The classification can be done for example by means of a database in which typical classes of reflectors and their characteristics are filed.

For example, at a distance from the 25 agitator blades agitators respectively show a positive speed component and a mirror-image negative one.

Medium supplied often exhibits a diffuse common speed component and this can also be detected.

Fixed installations are detectable at speed 0 due to a speed component. Likewise, an increasing or decreasing fill level can be identified based on a corresponding speed component.

Furthermore, historical information from previous measurements can be taken into consideration to determine the level echo from the distances of the significant reflectors.

If, for example, a reflector with a specific distance is already classified as a fixed installation part, this reflector can be ignored when determining the level echo. For example, the most recently determined fill level and a maximum filling or emptying speed of the underlying measuring vessel can be included in the determination. Here, based on the last determined fill level, the current fill level must be within a range predetermined by the filling and emptying speed.

As a method for the spectral analysis, a fast Fourier transformation (FFT) can be used, for example. The fast Fourier transformation is a widely used and effective method in signal processing for transmitting signals between the time and frequency range.

The emitted signal preferably comprises at least 25, further preferably at least 50, and ideally a few hundred frequency ramps which are transmitted.

The number of frequency ramps, which are included in a transmission signal, specifies the number of possible receiving signals. This number determines a maximum possible temporal resolution or speed resolution for the emitted signal of the second spectral analysis, so that the number of signal points is also associated with the determination of the phase change and thus the speed.

In the practical implementation of the method, the transmission signal shows a number of 2n frequency ramps, wherein the transmission signal typically contains 128, 256 or 512 frequency ramps. A corresponding number of frequency ramps offers a sufficiently fine resolution for applications, so that all relevant speeds can be recorded.

A frequency ramp can have a duration between 1 μs and 1000 μs. Typically, the duration of the frequency ramps ranges from 50 μs to 300 μs and, in particular, amounts to 100 μs or 200 μs.

The steeper the frequency ramps, i.e., the shorter the duration of the frequency ramp relative to a frequency stroke, i.e. the distance of a lower limit frequency is to an upper limit frequency of the frequency ramp, the greater the frequency shift of the receiving signal relative to the transmission signal. Consequently, steeper frequency ramps are preferred, since commercially available evaluation circuits which show increasingly smaller geometric dimensions are designed rather for the processing of high frequencies.

To exclude measurement errors, a start frequency and/or a slope and/or an increment and/or an end frequency of the frequency ramps can be varied.

Through a variation of the parameters of the method, e.g., the number of frequency ramps, the start frequency, the target frequency, the sweep period, or the break time between the frequency ramps in a transmission signal, here disturbances, e.g., by other transmitters, can be minimized and an analysis can be dynamically altered and optimized. For example, corresponding changes can be made depending on the speeds of the reflections observed so far, so that, for example, with regard to the speed analysis the resolution can be increased or decreased by adjusting the number of frequency ramps.

For example, it can also be provided that averaging is carried out via the raw data from the reception signals or the complex value echo curves obtained by the spectral analysis. Such averaging can be done automatically, for example, depending on the speed of the fill level reflection determined in a previous measurement.

In addition, it can be provided to render the speed values of the fill level echo or other reflectors available to the outside, i.e. to transmit this data as additional information to a control room for example.

It can be envisaged to use the invention in the context of imaging radar systems and to expand the location speed evaluation by method of beam forming.

In order to save energy and computing power, the fill level measurement under good measurement conditions can be carried out according to the prior art with a FMCW procedure and the procedure described above is only used if a fill level measurement with a FMCW procedure is not possible. For example, the extent of interference, or the amplitudes caused by interference in the reception signal or a malfunction caused by an ongoing filling process of the vessel, may lead to a reliable determination of the echo caused by the fill level surface using methods of prior art is no longer possible. Under these circumstances, due to the possibility to assign a speed to the individual reflectors, the fill level echo can continue to be determined and reliably displayed.

Through the introduction of a modulation with a fast successive sequence of individual sweeps and an appropriately implemented analysis of the detected signals, it is therefore possible to determine the speed at each reflection point in the vessel. By using such a local speed analysis, not only the distance to individual reflectors is determined within the vessel, but also the speed of the reflectors present at the respective position. In the analysis, this is used to determine the distance from the fill material with increased reliability. In this way, it is possible to classify the individual reflectors, and in particular to safely distinguish the fill level echo from interference echoes. In addition, various operating states can be differentiated within the measuring vessel in order to allow adapting and optimizing the signal preparation and signal analysis in the fill level measuring device automatically.

The decisive factor for this method is a defined time behavior, comprising an exact timing of the start and stop times for each frequency ramp and the breaks between the frequency ramps, and a defined frequency behavior, including the start frequency and stop frequency of the respective frequency ramp.

DETAILED DESCRIPTION OF THE FIGURES

Figure 5:
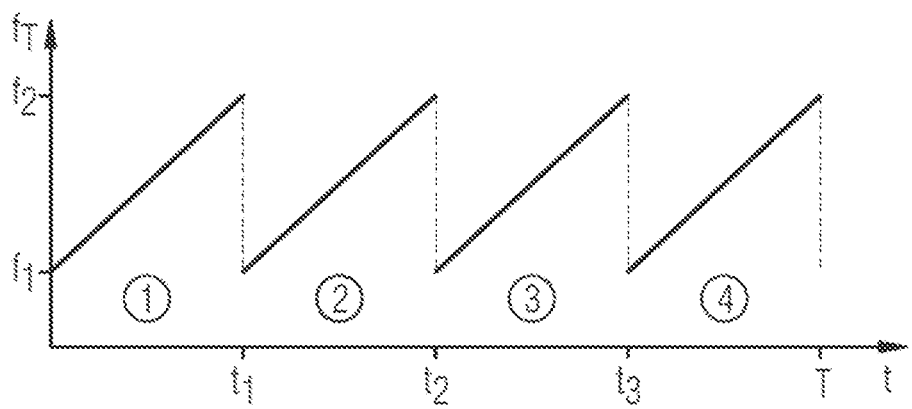
FIG. 5 is the transmission signal of a method for fill level measurement according to the present application.

FIG. 5 shows the transmission signal 104 of a method for fill level measurement according to the present application.

The transmission signal 104 is divided in this exemplary embodiment during a measurement cycle T in a period from t=0 to t=T into several frequency ramps 501, 502, 503, 504, within which a frequency f of the radiated radar signal is respectively modulated linearly from a start frequency f1 towards a target frequency f2. These individual frequency ramps are also called chirps. In contrast to the previously used modulation forms from the prior art, a pre-defined number of individual frequency ramps 501, 502, 503, 504 with defined time behavior and defined frequency behavior is radiated and received again during a measurement cycle T between t=0 and t=T in the direction of the fill material 107. In deviation from the illustration of FIG. 5, it can also be provided that a defined break time is introduced between at least two consecutive frequency ramps 501, 502.

Defined time behavior is here understood as a pre-known and precisely implemented timing of start and stop times for each frequency ramp 501-504 and the breaks between frequency ramps 501-504. A defined frequency behavior refers to the exact compliance with start frequency f1 and stop frequency f2 and the slope of the respective frequency ramps.

In FIG. 5, only four frequency ramps 501-504 are shown for better clarity. In an actual implementation of the present method, at least several dozen, preferably several hundred such frequency ramps 501-504 are emitted. The number of frequency ramps 501-504 is often a dual potency, in particular 128, 256, 512 or 1024. Higher or lower potencies can also be used depending on the respective application.

Figure 6:
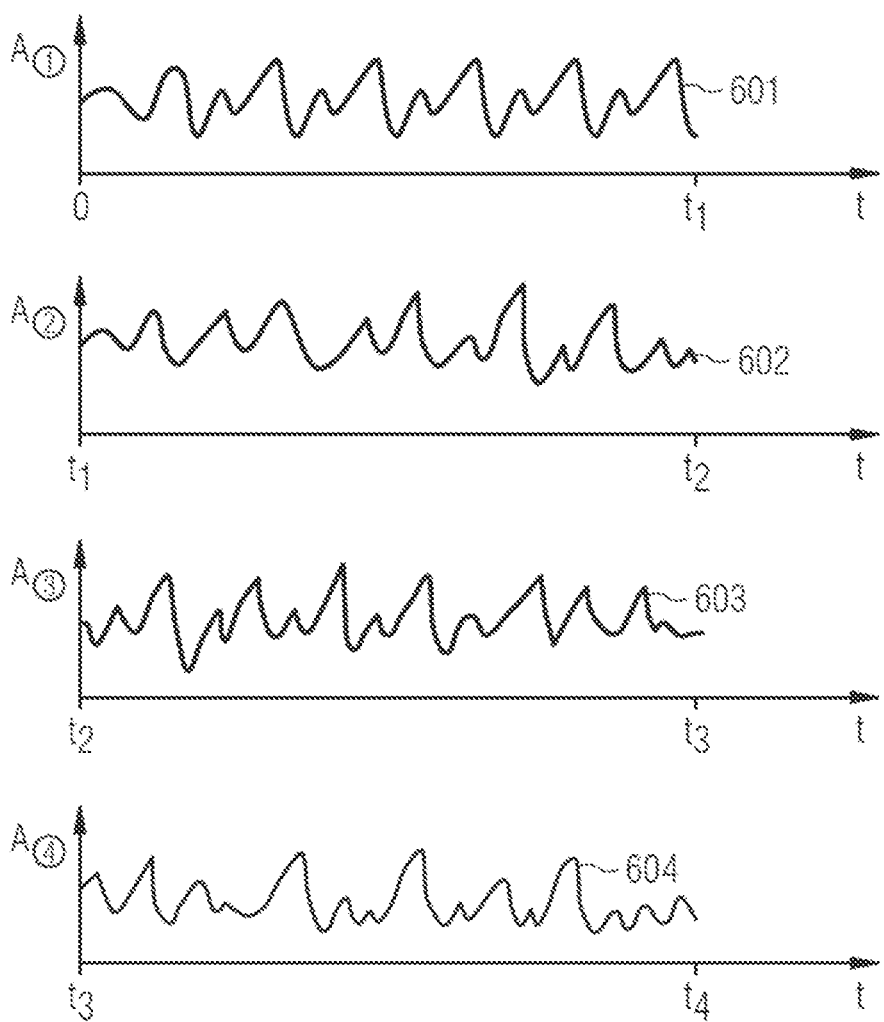
FIG. 6 is reception signals, as they are obtained from a transmission signal according to FIG. 5 with an arrangement according to FIG. 3.

FIG. 6 shows the reception signals 601, 602, 603, 604 recorded during the individual frequency ramps 501-504, hereinafter referred to as intermediate signals, and converted to an intermediate frequency. From a first frequency ramp 501, a first intermediate signal 601 results, from a second frequency ramp 502, a second intermediate signal 602 results, etc. In contrast to the previously used procedures, it must be noted that the intermediate signals 601-604 are shorter, but also include higher signal frequencies in comparison with the frequency ramp 209 in accordance with the prior art. The higher signal frequencies arise due to the increased slope of the frequency ramps 501-504.

In the context of the signal evaluation, a speed distance display is first calculated based on the intermediate signals 601-604.

A systematic representation to calculate such a speed distance display is shown in FIG. 7. For this purpose, the signals and calculation results are processed in a matrix-like format.

According to a first exemplary embodiment, in a first step, the intermediate signals 601-604 each are subjected to a first spectral analysis, for example a fast Fourier transformation. In the example of FIG. 6, four spectral analyses are first carried out, each one per intermediate signal 601-604. The complex spectral values resulting here are arranged in a matrix 700, whereby in the present exemplary embodiment the lines of the matrix 700 are precisely the echo curves 701, 702, 703, 704 resulting from the spectral analysis of the received signals 601, 602, 603 and 604 converted to an intermediate frequency.

Using echo curves 701-704, the distance to individual echoes E1, E2, E3, E4 can already be determined, whereby moving echoes are shown in good approximation due to the very short consecutive frequency ramps 501-504 at the same location of echo curves 701-704. An averaging via the echo curves 701-704 is shown in FIG. 8 as a determined echo curve 801.

In other words, it can be stated that the signal energy, as can be determined by means of echo curves 701-704, both in stationary reflectors and with moving reflectors, is formed in the measurement in at least approximately equal distance due to the very short time intervals. A determination of the speed of echoes is not possible based on these signals and the locations of the reflectors that can be recorded therein.

In a second process step, the matrix 700 is therefore processed further.

In this case, a second spectral analysis is carried out iteratively via each column 705, 706, 70x, of the matrix 700 each, preferably a fast Fourier transformation. In the present example, a large number of fast Fourier transformations are carried out iteratively via echo signals 701-704. The results are saved in the matrix 700 in turn.

In an alternative version according to a second exemplary embodiment of the present invention, the speed distance display of FIG. 7 can also be calculated by interchanging the first spectral analysis and the second spectral analysis. Here it is provided in a first step to analyze the respective scanning values of the intermediate signals 601-604 with the help of the second spectral analysis in the column direction, and enter the results into the columns 705, 706, 70x of the matrix according to FIG. 7.

In a subsequent, the values obtained in this way are transferred line by line (701, 702, 703, 704) with the means of the first spectral analysis into a local illustration, and also the resulting speed distance illustration of FIG. 7 is entered. The speed distance illustration obtained according to this second exemplary embodiment corresponds to the results of the speed distance display according to the first exemplary embodiment. The further processing steps are identical for both variants and are discussed below.

After completion of these calculations, the matrix 700 represents a so-called location speed matrix. Based on the signal curves in the rows of the matrix, the location of a reflector can be determined. In addition, the speed distribution at this location can be determined for a predetermined location (a specifiable column of the matrix) based on the signal progression of the column.

Physical basis of this second spectral analysis is the fact that the phase of the complex-quality samples of the echo curves 701-704 from measurement to measurement is not changed in case of stationary objects, yet in moving objects they increase or drop proportionally with the speed. This change in the phase can be examined in greater detail by a spectral analysis in the column direction.

In contrast to known procedures, the speed is not determined by measuring a distance change or a Doppler analysis, but by analyzing a change in the phase over time.

The actual echo determination and echo analysis are done after completion of the two spectral analyses in the row and column direction based on the complex values of the location speed matrix 700.

Firstly, by forming a value for at least one of the echo signals 701-704 or a averaged signal total of the previously mentioned individual signals, here a classic echo curve according to the illustration of FIG. 8 is converted. Based on the echo curve 801 shown there as an example, the relevant reflectors are determined first using the echoes E1, E2, E3, E4 and their distance d1, d2, d3, d4 from radar measuring device 101. The distances d1-d4 of the reflectors, as shown in FIG. 8, correspond to the distances d1-d4 from the reflectors of the arrangement according to FIG. 1.

In a second process step, a velocity distribution 901, 902, 903, 904 is determined in turn via an amount formation over the columns of the location speed matrix 700 corresponding to the distances d1-d4 of the relevant reflectors.

FIGS. 9A to 9D show the speed distribution at the locations (distances) of the relevant reflectors which were determined according to FIG. 8.

The first speed distribution 901 shows the change in the phase of the reception signals 701-704 at the position d=d1. In the arrangement according to FIG. 1, currently the agitator blade 103 is located at a first distance d1, whereby half of this agitator blade 103 is moved towards the radar measuring device 101, due to a rotation 110 of the agitator 102, and the other half moves away from the radar measuring device 101 at essentially the same speed. The speed distribution shows, as illustrated in FIG. 9A, an increased signal energy at the position of the positive speed VRotor and at the negative speed position – VRotor located symmetrically in reference thereto. Based on this characteristic, the radar measuring device 101 can clearly classify the corresponding reflection E1 as a reflection of an agitator 102.

In the next process step, the second speed distribution 902 is determined at the location d=d2 and analyzed. The corresponding reflection E2 is caused at the corresponding distance only by the supply pipe 106, which shows no movement. The spectrum shown in FIG. 9B 902 illustrates this by an increased signal energy at speed v=0. The fill level measuring device 101 can therefore at least limit this reflection site as a reflection from a stationary installation of the vessel or even from a non-altering fill level echo.

In the third speed distribution 903 shown in FIG. 9C, which was determined from the location speed matrix 700 at location d=d3, two characteristic signal increases are shown in the same way as in the spectrum 901, which can be classified in a simple manner as a reflection which is coming from the agitator 102.

A further analysis of the third speed distribution 904 shown in FIG. 9D at the position d=d4 illustrates a diffuse widening of an stationary signal. By the movement of the agitator, the surface of the fill material 107 is restless, for example, recesses form, which depending on their radius can be spread around the radius within a certain area around 0. This behavior differs significantly from the spectrum 907 of a classical stationary disturbance, which is why here clearly a fill level reflection can be concluded.

The previously shown exemplary embodiment thus expands the method of prior art to classify echoes by an additional analysis of the speed distribution 901-904 at the locations of relevant reflectors. The method therefore works also independently of time fluctuations in the amplitude of reflected echo signals E1-E4, which leads to a significantly improved reliability of the measurement.

Figure 3:
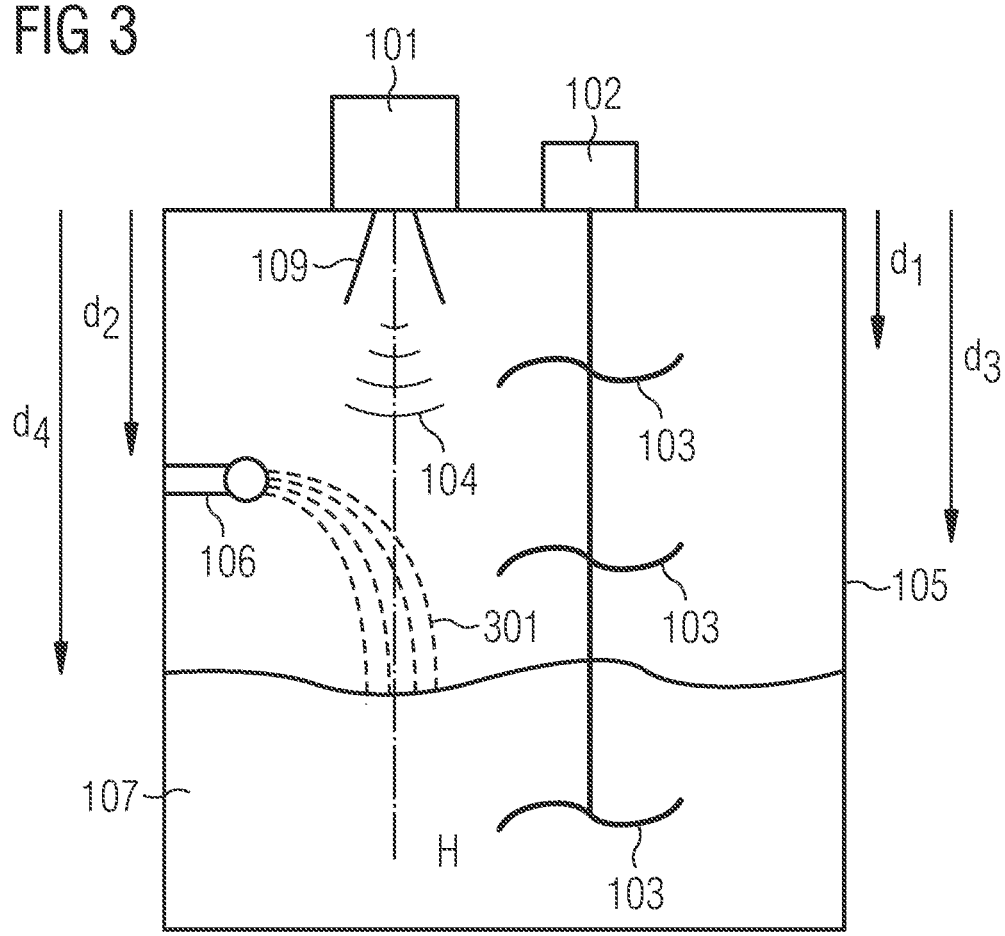
FIG. 3 is the fill level measuring arrangement of FIG. 1 with activated inlet.
Figure 10:
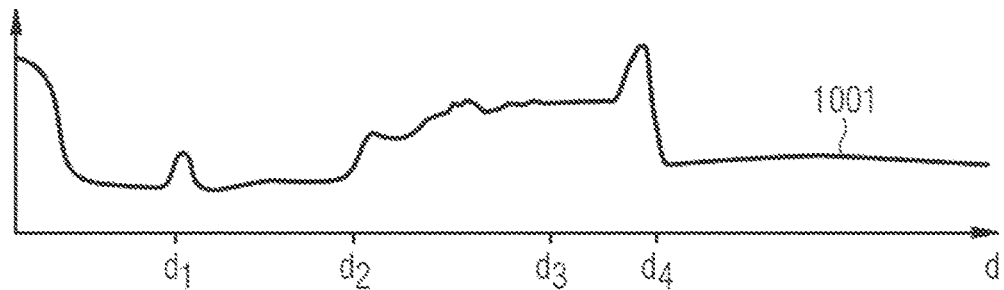
FIG. 10 is an echo signal, as can be determined from the reception signals according to FIG. 3.

FIG. 10 and FIG. 11 show the signal ratios in an example according to FIG. 3 in which the inflow into the measuring vessel 105 is activated, using the method according to the invention.

Figure 4A:
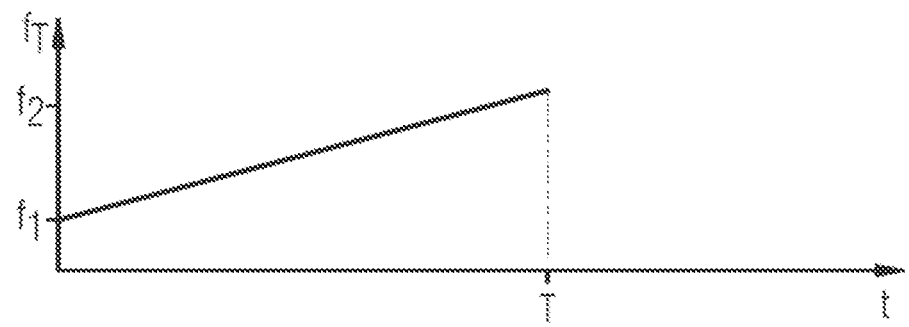
FIG. 4A-4C are signal curves in the fill level measuring arrangement according to FIG. 3.
Figure 4B:
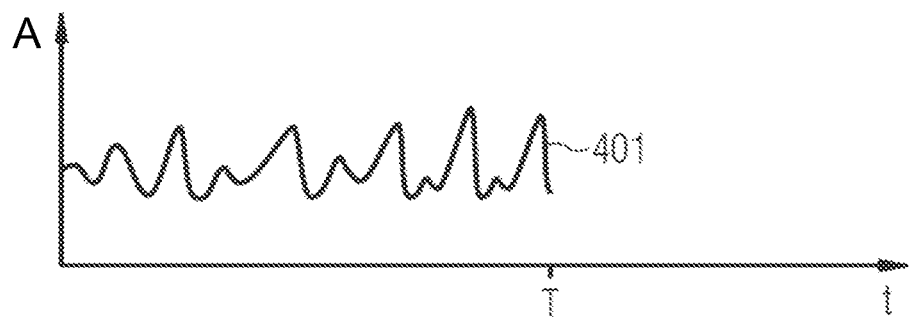
Figure 4C:
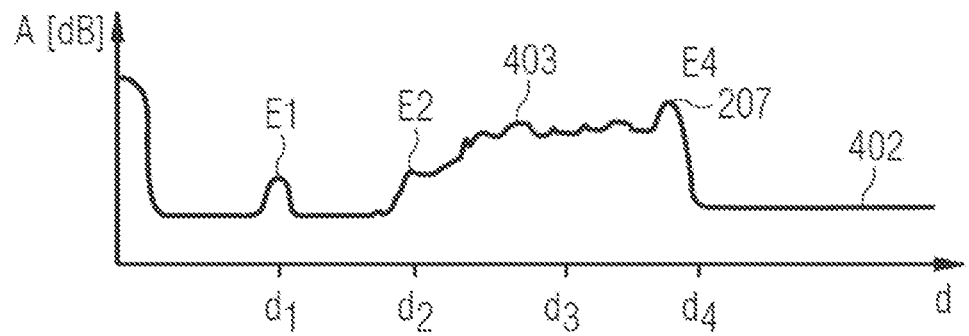

The echo curve 1001 calculated from the location speed matrix 700 and shown in FIG. 10 can be determined from the reception signals 601-604 and essentially corresponds to the echo curve 402 of FIG. 4C. By opening the inlet pipe 106, additional signal components 403 of the incoming fill material 301 are added to the echo curve 1001. In the analysis of the associated speed distributions 1101, 1102, 1103, 1104, according to the FIGS. 11A to 11D, additional information results which is used to classify the situation unambiguously.

Figure 11A:
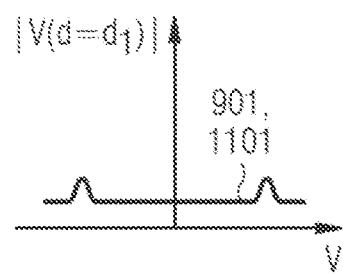
FIG. 11A-11D is the speed distribution at the locations of the 5 reflectors according to FIG. 10.
Figure 11B:
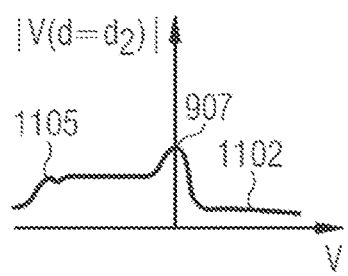
Figure 11C:
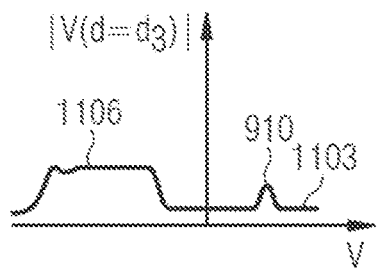
Figure 11D:
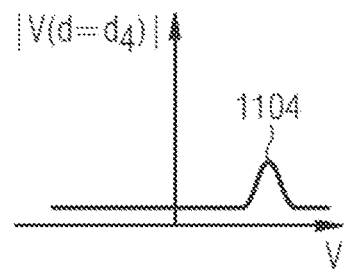
Figure 12:
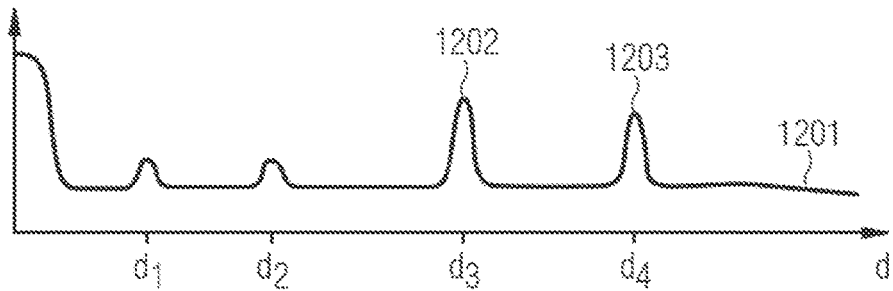
FIG. 12 is an echo signal for an emptying measuring vessel.
Figure 13A:
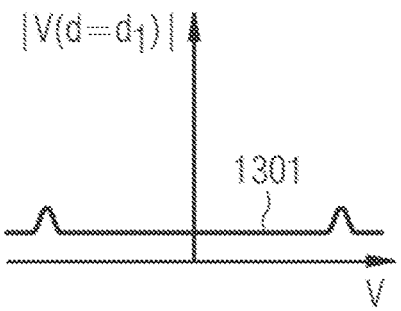
FIG. 13A-13D is the speed distribution at the locations of the reflectors according to FIG. 12.
Figure 13B:
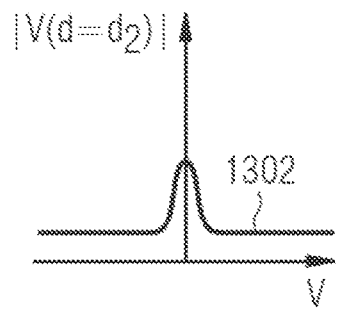
Figure 13C:
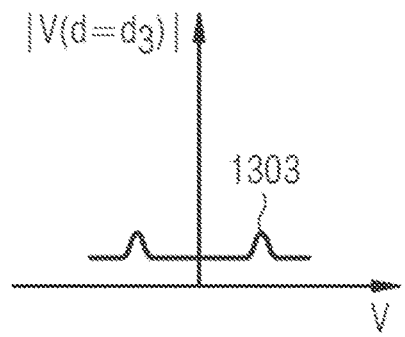
Figure 13D:
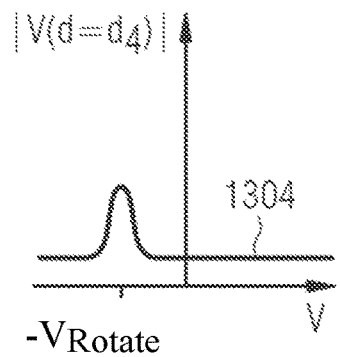

The first speed distribution 1101 shown in FIG. 11A, which reflects the speed values at a distance d=d1, is caused by the rotating agitator blades 103, and shows the characteristic features already explained in relation to FIG. 9A.

The second speed distribution 1102, which is shown in FIG. 9B, in relation to the position d=d2, initially contains an stationary speed component 907 of the supply pipe 10 106, and also negative speed components 1105 with a different amount. These diffuse negative speeds are caused by the downward accelerating particles of the inflowing fill material 301, and do not have any mirror-related counterparts in the positive speed range. The spectrum 1102 can therefore be clearly identified as a velocity profile of a supply pipe 106 with inflowing fill material 301.

In the spectrum 1103 shown in FIG. 9C, at a distance d=d3, symmetrical velocity proportions 909, 910 of the agitator blade 103 overlap with the speed components of the downward accelerated particles of the inflowing fill material 301. The spectrum 1103 therefore comprises the positive speed 910 of an agitator blade 103, but also the negative speed values 1106 of the inflowing fill material 301 over a certain range 1106. The radar measuring device 101—if necessary, with the addition of historical information from previous measurements—can unambiguously and independent from the respective echo determine reliably that the fill rate is recorded at position d=d3.

The fourth speed distribution 1304 shown in the analysis in FIG. 9D shows a single positive speed component in the position d=d4, which is caused by the top-moving surface of the fill material. Based on this observation and with the addition of the classification results regarding to spectra 1101, 1102, and 1103, the reflection 207 can be classified and measured safely and regardless of the amplitude values of the echo curve 1001, as a result of the fill material. The uncertainty of distance determination in the range between reflections 205, 207, and 403 which is common in the previous procedure can be effectively eliminated here.

FIGS. 12 and 13A-13D additionally show the conditions when emptying the vessel 105. The Spectra 1301, 1302, 1303 are classified in the same way as in the previous examples. Using the speed distribution of the spectrum 1304, it can be clearly determined that the container is emptied with the negative speed –VMedium. The reflection point 1203 of the echo curve 1201 can therefore clearly be determined as a medium reflection and the distance d4 is issued as a measured value.

It is pointed out at this point that this classification can be carried out independent of a storage of the interference echo to be performed in advance. It is also pointed out that reflection 1203 can also be recognized as a reflection of fill material even when other reflection points 1202 show a greater amplitude.

Figure 14:
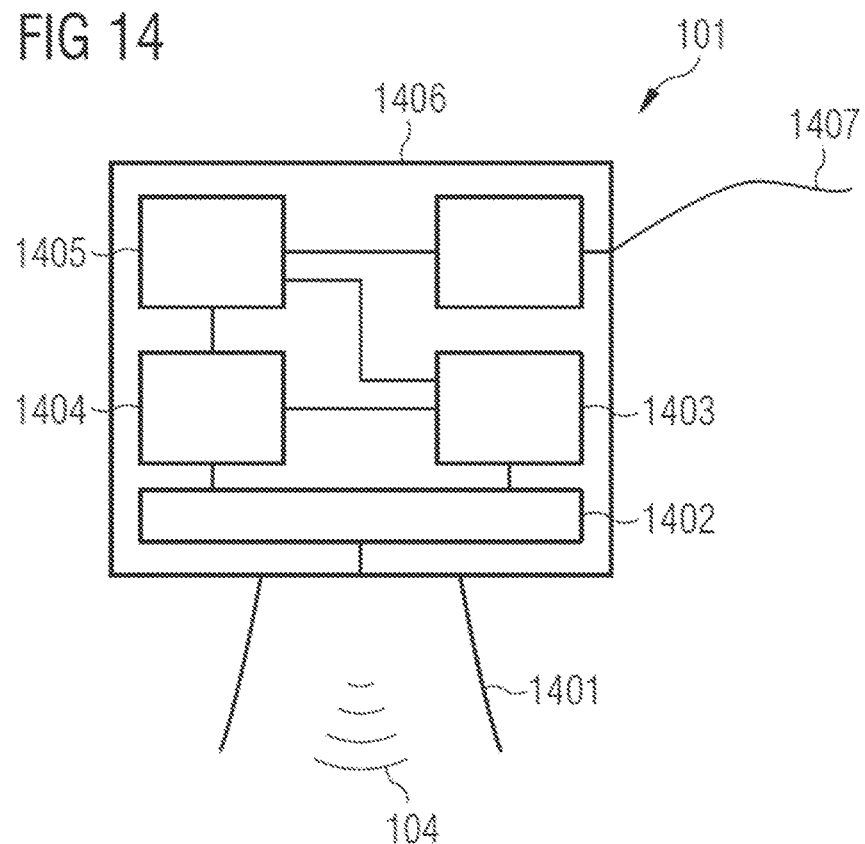
FIG. 14 is a block diagram of a fill level measuring device to carry out the procedure of the present application.

FIG. 14 shows a block diagram of a radar level measuring device 101 according to the invention.

The radar measuring device 101 determines in the interaction of a high-frequency unit 1402 and an antenna 1401, which emits the transmission signal 104 in the direction of the fill material 107, the reception signals 601, 602, 603, 604, reflected by the reflectors which are received by the antenna 1401. A location determination unit 1403 determines from these reception signals 601, 602, 603, 604 the distances d, d1, d2, d3, d4 to the individual reflectors in the measuring vessel 105. A speed analysis device 1404 determines the speed distribution, at least in reference to earlier determined distances d, d1, d2, d3, d4 of the reflectors in the measuring vessel 105.

An analysis unit 1405 determines, using the determined distances d, d1, d2, d3, d4 to the individual reflectors and considering at least one speed distribution of a pre-determinable distance value, e.g. by classifying the reflectors, at least one echo, and based on its position a conclusion can be drawn on the fill level in the measuring vessel 105. A communication unit 1406 20 provides to the outside, using at least one wired or wireless communication channel 1407, the measured value and/or a speed and/or a speed distribution.

FIG. 15 shows a typical sequence of a measuring method according to the invention.

The procedure begins at a start condition 1501. First, in a step 1502, based on a transmission signal 104 showing at least one sequence of individual frequency ramps 501, 502, 503, 504, as shown for example in FIG. 5, receiving signals 601, 602, 603, 604, as shown for example in FIG. 6, are recorded and stored in a memory of radar measuring device 101.

In step 1503, the reception signals 601, 602, 603, 604 are subjected to a first spectral analysis, for example a fast Fourier transformation, in the distance direction or direction of location, i.e. per reception signal 601, 602, 603, 604, which means in the matrix illustration shown in FIG. 7 in a line-by-line fashion.

In step 1504, a second spectral analysis in the speed direction is calculated based on the analyzed data, i.e. the results of the first spectral analysis across the individual frequency ramps. The second spectral analysis is thus carried out in the display of FIG. 7 in the column direction.

In step 1505, the distances of relevant reflectors from at least one echo curve 203 are determined.

In step 1506, at least one speed distribution is determined at the location of at least one relevant reflector, i.e. at the position of at least one relevant reflector in the echo curve 203 is examined by means of the second phase determined by spectral analysis, over the individual reception signals 601, 602, 603, 604.

In step 1507, at least one relevant reflector is classified by means of the previously determined information on distance, phase or speed and, if necessary, historical data from previous measurements, classified e.g. as fill level echo, agitator echo, interference echo, influx echo or ground echo.

In step 1508, the fill level reflection is determined. This can be done positively, i.e. if the fill level reflection was clearly classified in the previous step, it can be issued directly.

If a clearly positive identification of the fill level echo was not possible, then it is possible to proceed for example according to an exclusion procedure, taking into consideration the previously performed classification. In particular, here all relevant reflectors that do not clearly represent the fill level echo are excluded. Among the remaining relevant reflectors, considering additional data, e.g. historical data, i.e. data from previous measurements, the fill level echo is identified.

In step 1509, the distance d to the charge from the echo curve 203 is determined for the reflectors determined relevant as fill level reflection, for example, in step 1510 a distance is determined to the fill material or a corresponding numerical value, e.g. the residual volume, the fill level in percent, or the like, and rendered available before the method ends in step 1511.

LIST OF REFERENCE NUMBERS

100 Fill level measuring arrangement
101 Radar fill level measuring device/Radar measuring device
102 Agitator
103 Agitator blade
104 Measurement signal/transmission signal
105 Measuring vessel
106 Supply pipe
107 Medium
109 Antenna
110 Rotation
202 Curve
203 Curve, echo curve
209 Curve
301 inflowing fill material
401 Curve
403 Reflection parts of the inflowing fill material
501 first frequency ramp
502 second frequency ramp
503 third frequency ramp
504 fourth frequency ramp
601 first intermediate signal
602 second intermediate signal
603 third intermediate signal
604 fourth intermediate signal
701 first echo curve
702 second echo curve
703 third echo curve
704 fourth echo curve
801 Echo curve
901 first speed distribution
902 second speed distribution
903 third speed distribution
904 fourth speed distribution
1001 Echo curve
1104 first speed distribution
1102 second speed distribution
1103 third speed distribution
1104 fourth speed distribution
1401 Antenna
1402 High-frequency unit
1403 Local determination unit
1404 Speed analysis unit
1405 Evaluation unit
1406 Communication unit
1407 Communication channel
d Distance
d1 first distance
d2 second distance
d3 third distance
d4 fourth distance/fill level
f Frequency
f1 Start frequency
f2 Target frequency
t Time
t1-t4 Duration of a frequency ramp
T Measurement period
E1 first echo
E2 second echo
E3 third echo
E4 fourth echo
H First main emission direction The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A method for fill level measurement with a radar fill level measuring device using the following steps:

1. sending a transmission signal with a plurality of frequency ramps,
2. receiving a reception signal per frequency ramp of the transmission signals,
3. saving the reception signals in a memory,
4. performing a first spectral analysis of the reception signals,
5. determining distance of significant reflectors from the first spectral analysis of at least one reception signal,
6. performing a second spectral analysis of a plurality of output signals of the first spectral analysis at least at the position of one significant reflector in the reception signal,
7. determining speed values of significant reflectors from the results of th second spectral analysis, and
8. determinating a fill level echo.

2. The method according to claim 1, wherein the determination of the distance of significant reflectors takes place on the basis of a mean value over a plurality of reception signals.

3. The method according to claim 1, wherein a classification of each significant reflector takes place to determine the fill level echo from the distance intervals of the significant reflectors based on specific characteristics.

4. The method according to claim 1, wherein historical information saved in the memory is used to determine the fill level echo from the distance intervals of the significant reflectors.

5. The method according to claim 1, wherein the first and/or second spectral analysis is a fast Fourier transformation.

6. The method according to claim 1, wherein a transmission signal with at least 25 frequency ramps is sent.

7. The method according to claim 1, wherein the transmission signal comprises a number of frequency ramps being a power of two.

8. The method according to claim 7, wherein the transmission signal comprises 128, 256, or 512 frequency ramps.

9. The method according to claim 1, wherein a frequency ramp shows a duration between 1 μs and 1000 μs.

10. The method according to claim 1, wherein one or more of a start frequency a slope and a step width and a break time of the frequency ramp may vary.

11. A method for fill level measurement with a radar fill level measuring device using the following steps:
sending a transmission signal with a plurality of frequency ramps,
receiving a plurality of reception signals, 'wherein one reception signal is received per frequency ramp of the transmission signal,
saving the reception signals in a memory,
performing a second spectral analysis of the reception signals, wherein at least two of the reception signals of the plurality of reception signals are used,
performing a first spectral analysis of a plurality of output signals of the second spectral analysis,
determining a distance of significant reflectors from the results of the first spectral analysis,
determining speed values of the significant reflectors from the results of the second spectral analysis, and
determining a fill level echo.

12. The method of claim 9, wherein a frequency ramp shows a duration between 100 μs and 200 μs.

* * * * *